L. C. HARDSOCG.
LOCKING DEVICE.
APPLICATION FILED MAY 14, 1913.
1,092,908.
Patented Apr. 14, 1914.
2 SHEETS—SHEET 1.
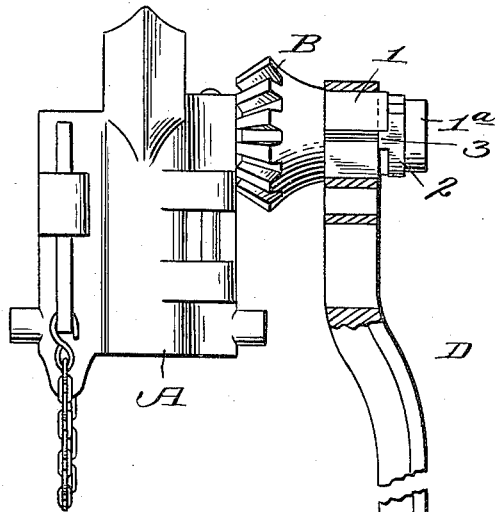
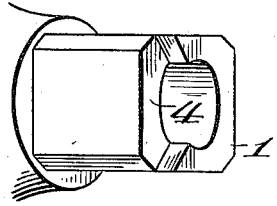
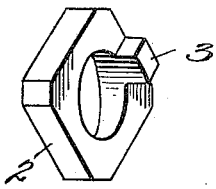
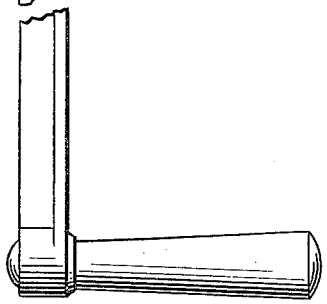
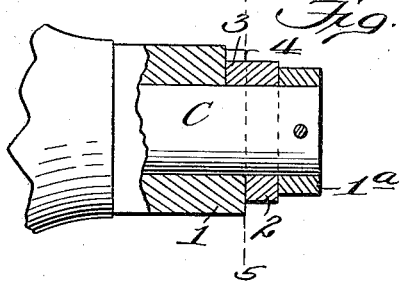
Witnesses:
Inventor
Lester C. Hardsocg
by
Attorney L. C. HARDSOCG.
LOCKING DEVICE.
APPLICATION FILED MAY 14, 1913.
1,092,908.
Patented Apr. 14, 1914.
2 SHEETS—SHEET 2.
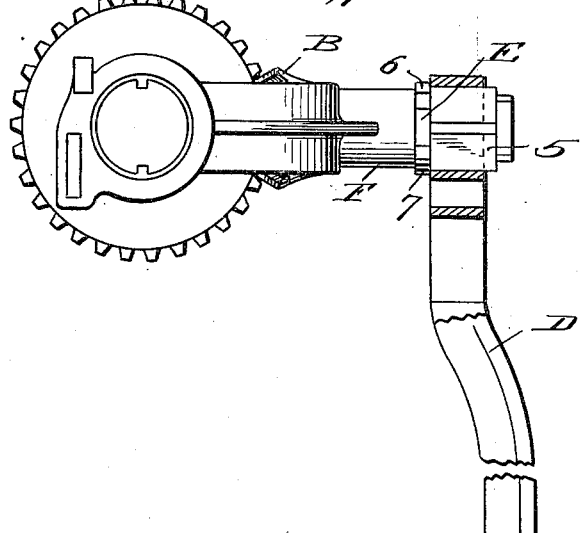
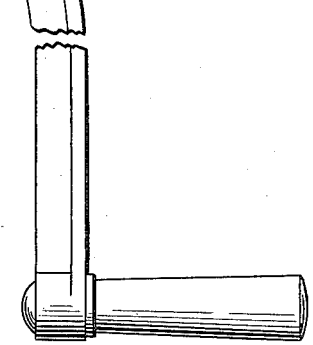
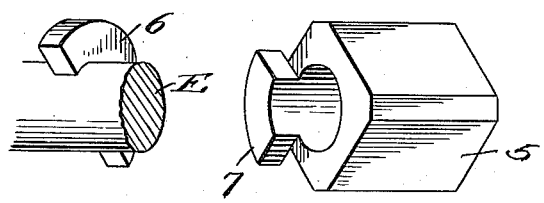
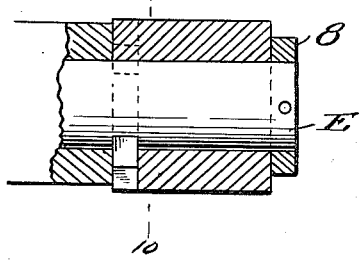
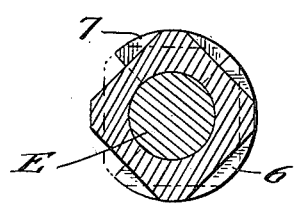
Witnesses:
Inventor
Lester C. Hardsocg
by
Attorney

UNITED STATES PATENT OFFICE.

LESTER C. HARDSOCG, OF OTTUMWA, IOWA, ASSIGNOR TO THE HARDSOCG MANUFACTURING COMPANY, OF OTTUMWA, IOWA, A CORPORATION OF IOWA.

LOCKING DEVICE.

1,092,908.  Specification of Letters Patent.  Patented Apr. 14, 1914.

Application filed May 14, 1913. Serial No. 767,700.

*To all whom it may concern:*

Be it known that I, LESTER C. HARDSOCG, a citizen of the United States, residing at Ottumwa, in the county of Wapello and State of Iowa, have invented new and useful Improvements in Locking Devices, of which the following is a specification.

This invention relates to an improvement in locking devices for use in positively maintaining the operative relation of shafts, gear hubs, and the like, and parts which are rotatable therewith and are designed for removal therefrom.

The invention is herein disclosed in its application to a shaft and a crank handle, and while it will probably have its most extensive use in this particular application, it will be understood that it is susceptible of use in other and analogous applications for the purpose of positively maintaining the operative relation of companion driving and driven parts, one of which is designed for detachment from the other.

The objects of the invention are to provide a device which is constantly influenced by one of the companion parts during the rotation thereof to positively prevent the disengagement or disconnection of said parts and which may be instantly and easily manipulated to provide for the engagement or disengagement of said parts; which may be readily incorporated in or applied to old mechanisms already in use; which entails no modification of the structure of the removable part, *e. g.* a crank handle, and, consequently, does not interfere with the interchangeable use of said removable part in connection with the various mechanisms which may be operated thereby; and which, withal, is of simple and inexpensive nature, is not liable to derangement, and involves no weakening of the parts to which it is applied.

Embodiments of the invention are illustrated in the accompanying drawings, which show applications of the improvement in connection with drill-bar rotating and feeding mechanism.

In said drawings:—Figure 1 is a view, partly in section, showing a drill-bar boxing which carries a hub driven gear element, and one form of the improved locking device for retaining the crank handle upon the hub of said gear element; Figs. 2 and 3 are perspective views showing respectively the construction of the hub of the gear element shown in Fig. 1 and the construction of the part which coöperates with said hub to retain or lock the crank handle thereon; Fig. 4 is a detail longitudinal sectional view showing the relation of the parts illustrated in Figs. 2 and 3; Fig. 5 is a cross-sectional view on the line 5—5 of Fig. 4; Fig. 6 is a view, partly in section, illustrating the features of the invention in connection with a shaft driven gear element, *e. g.* driving pinion, which is carried by the gear frame disclosed in Fig. 2 of my prior U. S. Letters Patent, No. 1,020,903, of March 19, 1912; Figs. 7 and 8 are detail perspective views illustrating coöperating parts of the device; Fig. 9 is a detail longitudinal sectional view illustrating the assembled relation of the parts shown in Figs. 7 and 8; and Fig. 10 is a cross-sectional view on the line 10—10 of Fig. 9.

Similar characters of reference designate corresponding parts throughout the several views.

Fig. 1 discloses a drill-bar boxing A carrying at one side thereof a bevel pinion B which forms an element of the gearing for rotating the drill-bar and is rotatably mounted on a laterally projecting stud C.

The pinion B has an extended hub 1 which, as disclosed, is squared to conform to the outline of the opening in the attachment end of the crank handle D, it being understood that this handle is fitted on the hub 1 in the usual manner, and is used to operate the gearing aforesaid.

Adjacent the end of the hub 1, a locking plate 2 is mounted. The plate 2 conforms in shape and dimensions to the hub 1 and is loosely mounted on the stud C. When the plate 2 is positioned so that its flat faces are co-planar with the flat faces of the hub, the crank handle may be fitted to said hub or removed therefrom, as the case may be. When the handle is fitted to the hub, the plate 2 is moved to a position wherein its faces are in planes at an angle to the planes of the flat faces of the hub, as indicated in Fig. 5, and in such positions, the corner portions of said plate engage over the attachment end of the handle D and thereby positively hold said handle against displacement from said hub by an outward movement in the direction of the axis thereof.

The plate 2 may be permanently mounted on the stud C in any convenient manner, for example, by providing a head 1ª at the end of the stud which engages over said plate and holds the latter in relation to the hub 1.

The plate 2 is constantly influenced by said hub during the rotation thereof to lockingly engage the attachment end of the handle, and yet may be instantly and easily manipulated to provide for the detachment of the handle from the hub. For these purposes the plate 2 is provided with an inwardly projecting lug 3 located adjacent an edge thereof, and the hub 1 has at its end an edge recess 4, in which the lug 3 works and which is considerably wider than said lug.

The plate 2 is first positioned so that its faces are co-planar with the faces of the hub 1 and, thereupon, the handle D is fitted on said hub in the usual manner. By virtue of the relative dimensions of the lug 3 and the recess 4, the plate 2 is rotatable relatively to the hub 1, and it follows that when the rotation of the hub is effected by said handle, the plate 2 remains relatively stationary until such time as its lug 3 engages an end of the recess 4. At such time the plate 2 is in position to lockingly engage the attachment end of the handle, and this position is maintained during the rotation of the hub, since the plate 2 after the engagement of its lug 3 with the end of the recess 4, rotates with the hub, as is obvious. When it is desired to detach the handle, the plate 2 is turned to a position wherein its faces are co-planar with the faces of the hub, so that it forms, in outline, a practical continuation of the hub, and thereupon the handle is removed in the usual manner. The results stated may be secured regardless of the direction of rotation of the hub by making the recess 4, as shown, symmetrical relatively to the lug 3 in the position which the latter assumes when the faces of the hub and of the plate 2 are co-planar. In this way the lug 3 will, of course, seek either end of the recess 4, in accordance with the direction of rotation of the hub.

In the construction shown in Figs. 6 to 10, the pinion B is mounted on a shaft E, which latter is journaled in a bearing F and has an end portion which projects for some distance beyond said bearing. In this construction, a driving member 5 is rotatably mounted on the shaft E and is squared to conform to the opening in the attachment end of the handle D. The shaft E is provided with a semi-annular flange 6, and the member 5 is provided with an inwardly projecting lug 7 of less extent than said flange and which has driving engagement with the latter. A locking plate 8 is mounted on the end of the shaft E immediately adjacent the driving member 5, and this locking plate corresponds in outline and dimensions to the driving member, and is fast on said shaft.

The member 5 is first positioned so that its faces are co-planar with the faces of the plate 8, and thereupon the handle is fitted upon the driving member in the obvious manner. When the handle is turned to operate the gearing, the member 5 has a preliminary movement relatively to the shaft E, but this preliminary relative movement, of course, ceases when the lug 7 comes into driving engagement with an end of the flange 6. At such time, the faces of the driving member are disposed at angles to the faces of the plate 8 and the corner portions of the plate 8 engage over the attachment end of the handle and positively prevent displacement of the latter from the member 5. This relation is, of course, maintained throughout the period of rotation of the shaft. To remove the handle, the latter is turned in a reverse direction, until the co-planar relation of the faces of the member 5 and the plate 8 is established, whereupon the handle is disengaged from the member 5 in the obvious manner.

It will be observed that in both of the forms disclosed the locking device comprises two companion coaxially arranged coacting parts, (these being the elements 1 and 2 in Fig. 1 and 5 and 8 in Fig. 6); that the part upon which the handle D is fitted (1 in Fig. 1 and 5 in Fig. 6) functions as a power transmitting connection between the companion rotatable elements, (e. g. the handle D and the pinion B in Fig. 1 and the handle D and the shaft E in Fig. 6); that the other part (2 in Fig. 1 and 8 in Fig. 6) functions as a lock for the element which is detachably mounted upon the power transmitting part; and that there is an operative connection between the parts (constituted in Fig. 1 by the lug 3 and recess 4 and in Fig. 5 by the flange 6 and the lug 7) whereby the locking part turns with the power transmitting part, but in so turning, of necessity must exercise its locking function, but whereby the parts may be positioned with their faces in co-planar relation for the purposes described.

It follows from the foregoing analysis that while the organizations of parts in Figs. 1 and 5 are different and operate in a somewhat different manner, the same principles of operation prevail in both cases.

Having fully described my invention, I claim:

1. In combination, two companion coacting and coaxially arranged parts, one of which functions as a power transmitting element and the other of which functions as a locking element, two companion rotatable elements operatively connected by the power transmitting part, one of the rotatable elements being detachably mounted on the power transmitting part, and a means of operative connection between the companion coacting parts whereby the locking part rotates with the power transmitting part and during its rotation functions to lock the detachable rotatable element upon said power transmitting part and whereby said parts may be moved relatively to one another into such relation as will enable the detachable rotatable element to be engaged upon or to be removed from the power transmitting part.

2. In a locking device of the character set forth, the combination with a shaft and an element rotatable therewith, of two companion coacting and coaxially arranged parts, one of which is loose on the shaft and functions as a power transmitting connection between the latter and said rotatable element and the other of which is fast on the shaft and functions as a locking element for preventing displacement of said rotatable element, the latter being detachably mounted on the power transmitting part, and a means of operative connection between the companion parts comprising a flange partially circumscribing the shaft and a lug provided on the power transmitting part for engagement with the flange and in such relation that when it engages the flange the locking part exercises its function, the companion parts being capable of relative turning movement whereby they may be related to permit the rotatable element to be engaged upon or to be removed from the power transmitting part.

3. In combination, two companion coaxial parts of similar outline and dimensions, two companion rotatable elements operatively connected by one of the parts, one of the rotative elements being detachably mounted on the connecting part, the other part serving to lock the detachably mounted element in position, and a means of operative connection between the companion parts whereby the locking part turns with the connecting part in such relation as to exercise its locking function and whereby the locking part may be turned relatively to the connecting part to a position wherein it permits the removal of the detachably mounted element.

In testimony whereof I have hereunto set my hand in presence of two subscribing witnesses.

LESTER C. HARDSOCG.

Witnesses:
RUFUS E. SHEOFE,
ELIZABETH MASCHIK.